United States Patent [19]

Widl

[11] 4,061,881

[45] Dec. 6, 1977

[54] METHOD AND APPARATUS FOR GENERATING A NUMBER OF WEAKLY CORRELATED PSEUDORANDOM PULSE TRAINS

[75] Inventor: Walter Herbert Erwin Widl, Bandhagen, Sweden

[73] Assignee: Telefonaktiebolaget L M Ericsson, Stockholm, Sweden

[21] Appl. No.: 706,928

[22] Filed: July 19, 1976

[30] Foreign Application Priority Data

Aug. 15, 1975 Sweden .................................. 7509183

[51] Int. Cl.² ................................................ H04J 3/00
[52] U.S. Cl. ................................................ 179/15 BF
[58] Field of Search ............ 179/15 BF, 175; 325/41, 325/42

[56] References Cited

U.S. PATENT DOCUMENTS

| | | | |
|---|---|---|---|
| 2,974,198 | 3/1961 | McLeod | 179/15 BF |
| 3,892,923 | 7/1975 | Ranner | 179/15 BF |

*Primary Examiner*—Thomas A. Robinson
*Attorney, Agent, or Firm*—Hane, Roberts, Spiecens & Cohen

[57] ABSTRACT

A method and apparatus for generating a number of weakly correlated pseudorandom pulse trains which is especially useful for generation of noise signals utilized for measurements on telephone cables carrying PCM traffic. The apparatus generates a number of mutually phase shifted versions of a binary pulse train which are sampled with individual sampling signals of the same nominal frequency.

8 Claims, 4 Drawing Figures

METHOD AND APPARATUS FOR GENERATING A NUMBER OF WEAKLY CORRELATED PSEUDORANDOM PULSE TRAINS

The present invention refers to a method and an apparatus for generating a number of weakly correlated pseudorandom pulse trains to be used as noise signals when measuring on telephone cables.

The possibility of transmitting digitally coded information such as pulse code modulated (PCM) speech via a certain line pair in a symmetrical line-pair cable is limited by different factors. Among other things are the crosstalk from other pulse code modulated (PCM) systems in the same cable as well as interference arising from the signalling between the telephone exchanges, nearby railways, power lines, etc.

The crosstalk is caused by the capacitive and inductive unbalances between pairs in the cable, and the difference in the crosstalk between the different pairs can be considerable. When the two transmission directions are to be installed in the same cable, the number of pairs which can be utilized for PCM transmission is mainly limited because of the quality of the respective transmissions is affected by the so-called near-end crosstalk, i.e., the crosstalk which arises in the cable between pairs which carry traffic in opposite directions. (One speaks in connection with crosstalk about the disturbing pair or pairs and the disturbed pair respectively.)

The crosstalk is a phenomenon which appears in all signal transmission via cables, but its importance increases when the transmission is pulse formed signals. This is due to the fact that the pulse formed signals or pulses generally have a wide frequency spectrum combined with the fact that the crosstalk increases rapidly with increasing frequency. The transmission of an unmodulated speech signal requires, for example, a bandwidth of some kHz while the transmission of a 32-channel-PCM system for speech demands a bandwidth of several MHz.

Before installing a PCM system on a cable with insufficiently known crosstalk characteristics, it will thus be necessary to measure its crosstalk characteristics. This can imply that the near-end crosstalk as well as the far-end crosstalk are measured between different signal flows in the cable. In Electrical Communication, Volume 47, No 4, 1972, page 293 there is described a method for the measurement of near-end crosstalk between two pairs in a cable. The method uses a so-called pseudorandom signal generator in order to simulate real PCM traffic. Such a generator gives at its output a pulse train with a pulse sequence which is created through a certain definite procedure but, in spite of this, may be considered random for certain requirements.

The generator is connected to one end of the disturbing pair and the power transferred by crosstalk is measured at the near-end of the disturbed pair.

It is obvious to extend the measurement to a simultaneous measurement of the influence on the disturbed pair from several disturbing pairs. However, the resemblance of real conditions should not be especially good if several disturbing pairs were fed parallelly from the same noise source.

A real PCM signal is organized in so-called frames, each of which comprises a number of so-called time slots, one for every speech channel, which in their turn, comprise a fixed number of binary positions. In the pulse train a certain bit sequence which is repeated once for every new frame is utilized for synchronizing purposes at the receiving end. In these time slots a coded sample of the speech signal of the channel is transmitted. This pulse signal which is completely random during the speech becomes more regular during speech intervals, pauses between words, etc. As a result of this frame construction of the signal there is, actually, a slight correlation between different PCM signals on a cable. Every PCM system, however, has its own clock generator.

These complicated conditions can be imitated for measuring purposes, by means of a plurality of generators, each of which feeds its disturbing pair. The generators may, at their outputs, deliver pseudorandom pulse trains with as long pseudorandom words as possible, i.e. with as long time as possible before the pulse pattern is repeated, or a signal consisting of a combination of pseudorandom and rest information.

In order to execute a realistic measurement of a cable there is need for at least twenty noise signals with the above-described properties. If a solution with a separate generator for each noise signal is chosen, in order to receive a weak correlation between the noise signals, there is a considerable power consumption for the clock frequencies in question. This will be especially severe with a measuring equipment which is portable and battery powered.

An object of the present invention is to provide method and apparatus for generating test signals according to the above, whereby a simple construction with relatively few components offers a considerable power saving.

The characteristics of the invention appear from the characterizing parts of the accompanying claims.

Other objects, features and advantages of the invention will be apparent from the following detailed description when read with the accompanying drawing which shows the presently preferred embodiment of the invention. In the drawing.

Figure 1:
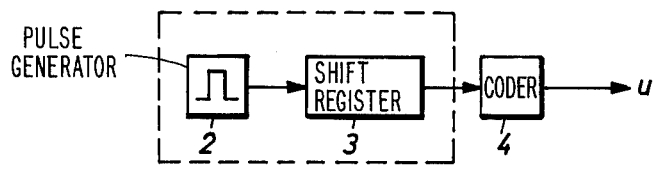
FIG. 1 shows a known test signal generator.

In FIG. 1 a test signal generator of the conventional kind is shown. The generator consists mainly of a circulating shift register 3, a shift pulse generator 2 connected to the shift input of the register, and a coder 4 connected to the output of the register. Before the start of the operation a certain data word is entered in the register. At every shift pulse from the generator 2 the contents of the register is shifted one step forward simultaneously as feed-back from the binary storage cells of the register to its input shifts new information into the register. By choosing the feed-back structure suitably, a small number of register stages will produce very long pulse sequences at the output of the register before there is repetition.

PRBS-generators (Pseudo Random Binary Sequence) of this kind, which can be held as special cases of so called linear sequence networks are described in, for example, Colomb Solomon W., "Shift Register Sequences", Holden-Day Inc., San Francisco, 1967 and Gill, Arthur, "Linear Sequential Circuits" McGraw Hill, New York, 1966.

The output signal from the shift register as well as a binary PCM signal have a signal spectrum with considerable energy contents at low frequencies. In order to make the information more adapted for transmission, it is common to code the binary PCM signal to a three-level-signal, whereby a mean value close to zero is obtained and thus the energy contents of the spectrum at low frequencies is reduced. An ordinary standardized three-level-code is the so-called AMI code (Alternate Mark Inversion).

As the signal spectrum is changed as a consequence of the coding process, it is necessary to code the binary pseudorandom pulse sequence from the shift register in such a way that, during the crosstalk measurement, the signal type which is intended to be transmitted via the cable at operating conditions is imitated. In the measuring equipment, a coder and adaption circuit 4 is included for this purpose, the output signal U of which then feeds a disturbing pair.

Figure 2:
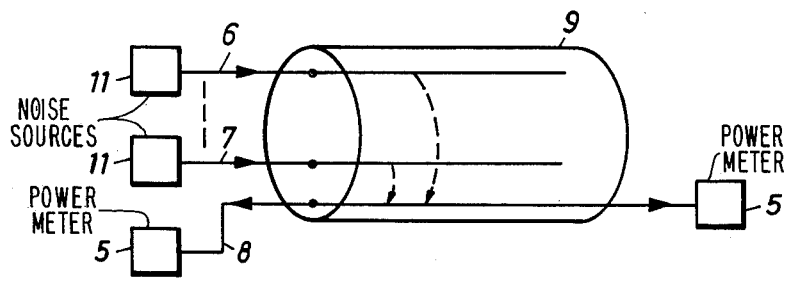
FIG. 2 shows a measuring equipment for estimating the crosstalk influence on a disturbed pair.

FIG. 2 shows a measuring equipment for estimating the crosstalk influence on a disturbed pair 8 from a number of disturbing pairs 6, 7 in a cable 9. Each of the noise sources 11 which are of the type shown in FIG. 1 feeds one disturbing pair. By means of power meters 5 connected to the near-end and the far-end respectively of the disturbed pair 8, it is possible to measure to what extent the power supplied to the disturbing pairs is transferred to the disturbed pair 8. This measuring method has, as mentioned above, a considerable power consumption and is thus inconvenient when it is desired that the measuring equipment be battery powered.

Figure 3:
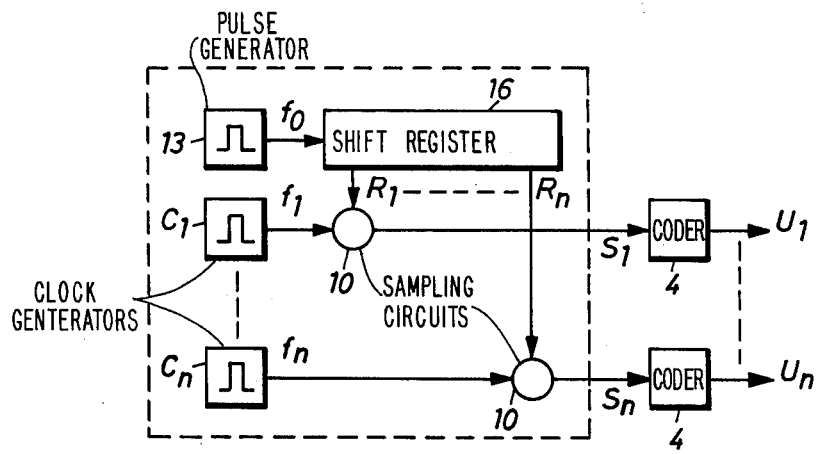
FIG. 3 shows a block diagram of apparatus according to the invention.

An embodiment of the present invention is shown in FIG. 3. By means of only one feed-back shift register 16, it is possible in this apparatus to create a number $n$ of weakly correlated pseudorandom pulse signals $S_1...S_n$ which, after being coded in coder 4, as described above, can be fed to a number of disturbing pairs on the cable.

Figure 4:
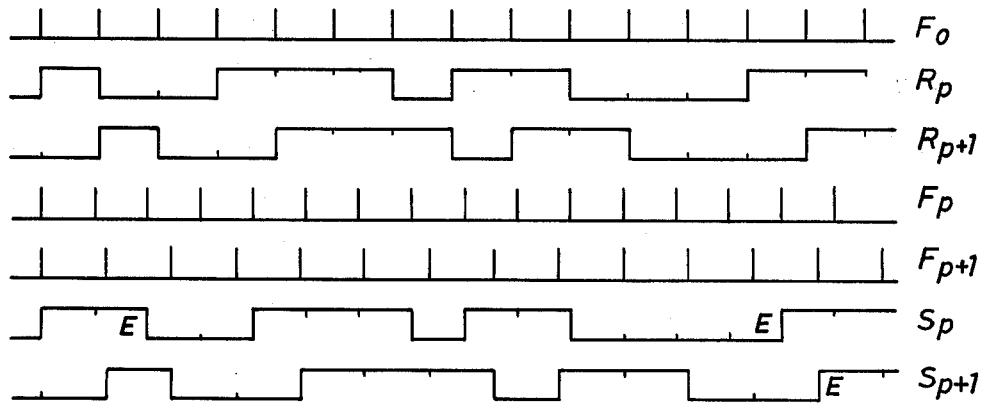
FIG. 4 shows waveforms of simultaneously occurring signals in the apparatus of FIG. 3.

An output signal $F_o$ with the frequency $f_o$ of a shift pulse generator 13 shifts digital information, as described above, through a shift register 16. The waveform of the signal $F_o$ is shown in FIG. 4. The output signals $R_1...R_n$ from a number of storage cells in the register are available on a corresponding number of outputs. When the information is shifted through the register, the output signals $R_1...R_n$ will be phase-shifted versions of the same pseudorandom pulse sequence with the pulse frequency $f_o$. The correlation between the signals $R_1...R_n$ is thus strong. In FIG. 4 two such signals $R_p$ and $R_{p+1}$ are shown from two consecutive storage cells in the register. The signal $R_{p+1}$, a copy of the signal $R_p$, is here phase shifted one pulse length.

Each output of the register is connected to a respective sampling circuit 10 in which the sampling of the signal $R_1...R_n$ is carried out concurrently by a clock signal $F_1...F_n$, with the frequency $f_1...f_n$, individual for each sampling circuit. The clock signal is fed to the sampling circuit from a respective clock signal generator $C_1...C_n$. The generators $C_1...C_n$ are free running oscillators, for example, multivibrators or RC-oscillators with the same nominal frequency $f_o$, but with comparatively low tolerance demands. Thus, the frequencies of the output signals $F_1...F_n$ will with high probability deviate from the frequency $f_o$. In FIG. 4, two clock signals $F_p$ and $F_{p+1}$ are shown, where the frequency $f_p$ is higher and the frequency $f_{p+1}$ is lower than the frequency $f_o$. In FIG. 4 the output signal $R_p$ from the register sampled with the clock signal frequency $f_p$ has the designation $S_p$. As the frequency $f_p$, according to the above, deviates from the pulse frequency $f_o$ of the signal $R_p$, the signal $S_p$ will contain deviations in the pulse sequence compared with the signal $R_p$. The same relation is valid for the other signals $S_i$ compared with their respective output signals $R_i$. Such deviations have, in FIG. 4 for the signals $S_p$ and $S_{p+1}$, been indicated with the letter E.

Thus, by the introduction of the above deviations E, the correlation between the signals $S_1...S_n$ will be weaker than between the corresponding signals $R_1...R_n$ at the same time as the pseudorandom properties of the separate signals $S_i$ will be improved. These relations will also be valid for the coded pulse sequences $U_1...U_n$, useful as noise signals, according to the above, at the outputs from the coders 4 the inputs of which are fed by the signals $S_1...S_n$.

We claim:

1. A method of simultaneously generating a plurality of parallel trains of output signals switching between first and second signal levels comprising the steps of generating a plurality of binary pulse trains each having the same given pulse repetition frequency and same pulse patterns but time-phase displaced from each other by at least one pulse time, generating a plurality of sets of sampling signals, each of said sets of sampling signals being assigned for sampling for the presence of pulses in a different one of the binary pulse trains, the frequency of the sampling signals in each set being within a range surrounding said given pulse repetition frequency with some of the frequencies being different from each other, and from the sampling of a binary pulse train, generating an output signal having a first level when there is a coincidence of a sampling signal and a pulse in the associated binary pulse train and only switching from that first level to a second level when at the occurrence of a sampling signal there is no pulse in the associated binary pulse train.

2. Apparatus for simultaneously generating a plurality of parallel trains of variable-width output pulses comprising parallel pulse train generating means for generating N trains of binary pulses, where N is an integer, each of said trains having the same given pulse repetition rate and same sequential pulse patterns but time-phase displaced from each other by at least one pulse time, sampling pulse generating means for generating N sets of sampling pulses, the pulse repetition rates of each of said sets being within a range encompassing said given pulse repetition rate with some of said rates being different from each other, and N output pulse generating means for generating output pulses, each of said output pulse generating means having input means for receiving one of said sets of sampling pulses and one of said trains of binary pulses and including means for initiating an output pulse when there is a coincidence of a sampling pulse and a binary pulse and for terminating the output pulse when a binary pulse is not present during the occurrence of a sampling pulse.

3. The apparatus of claim 2 wherein said parallel pulse train generating means comprises a multistage shift register means wherein at least some of the stages have outputs connected to intput means of said output pulse generating means.

4. The apparatus of claim 2 wherein said shift register includes feedback means.

5. The apparatus of claim 2 wherein said sampling pulse generating means comprises a plurality of mutually unsynchronized oscillator means having frequencies equal to said given pulse repetition rate.

6. The apparatus of claim 5 wherein said oscillator means comprise sinusoidally RC-oscillators.

7. The apparatus of claim 5 wherein said oscillator means comprise relaxation oscillators.

8. The apparatus of claim 7 wherein said relaxation-oscillators comprise multivibrators.

* * * * *